(No Model.)
T. G. KIRKPATRICK.
GAS FURNACE FOR METALLURGIC PURPOSES.
No. 308,564. Patented Nov. 25, 1884.
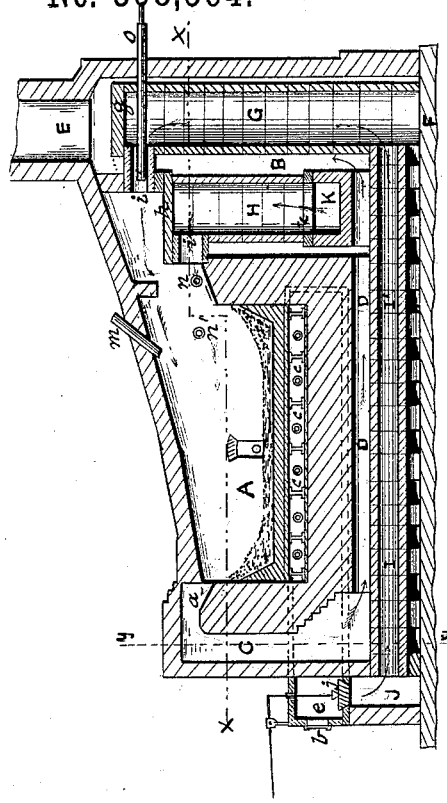
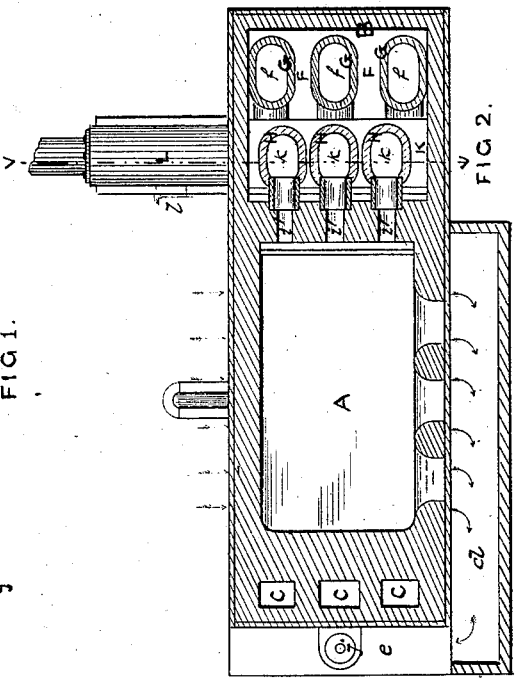
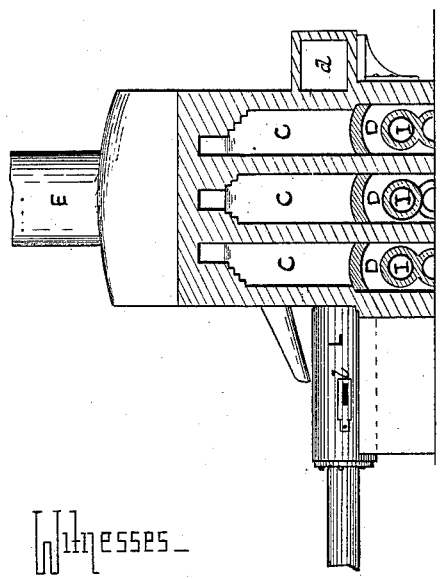
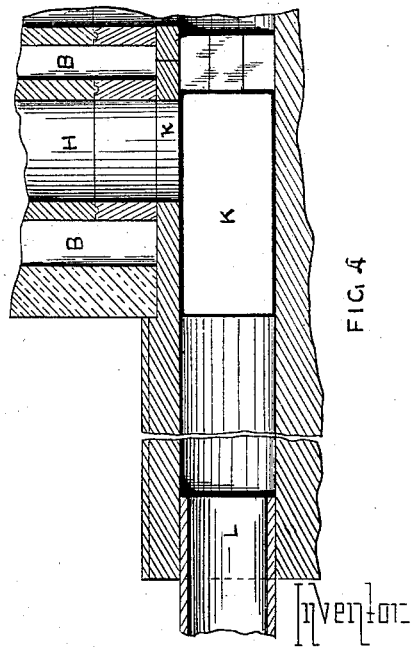
Witnesses
John C. Kirkpatrick
W. Bakewell
Inventor
Thomas G. Kirkpatrick

UNITED STATES PATENT OFFICE.

THOMAS G. KIRKPATRICK, OF LEECHBURG, ASSIGNOR TO HIMSELF, AND JOHN C. KIRKPATRICK, OF PITTSBURG, PENNSYLVANIA.

GAS-FURNACE FOR METALLURGIC PURPOSES.

SPECIFICATION forming part of Letters Patent No. 308,564, dated November 25, 1884.

Application filed December 24, 1883. (No model.)

*To all whom it may concern:*

Be it known that I, THOMAS G. KIRKPATRICK, of Leechburg, in the county of Armstrong and State of Pennsylvania, have invented a new and useful Improvement in Gas-Furnaces for Metallurgic Operations; and I do hereby declare the following to be a full, clear, and exact description thereof, reference being had to the accompanying drawings, in which—

Figure 1 is a longitudinal vertical section of my improved furnace. Fig. 2 is a horizontal section along the dotted line $x$ $x$ of Fig. 1. Fig. 3 is a transverse vertical section on the line $y$ $y$ of Fig. 1. Fig. 4 is a vertical section through the gas-induction pipe on the line $v$ $v$ of Fig. 2.

In the several figures like letters designate similar parts.

My improved furnace is designed for the use of gaseous fuel, either the carbureted-hydrogen gas obtained from the earth, which I shall designate by the term "natural gas," or artificial carbureted hydrogen obtained by the decomposition of hydrocarbons, or carbonic oxide obtained from the imperfect combustion of coal, as may be desired. My improved furnace, however, is more particularly designed for the utilization of natural gas, and embraces certain improvements which are especially adapted for that purpose.

In the furnace described in this specification I do not use the devices commonly known as "regenerators" for heating the gas and air by passing through a pair of regenerators which had been previously heated by the effluent products of combustion; neither does my furnace involve the alternation of the influent and effluent currents through two pairs of regenerators. By avoiding such construction I am enabled to maintain a more regular and uniform heat than can be obtained where the influent gas and air enter through a pair of regenerators which are gradually cooling, and then are suddenly changed to pass through the other pair of regenerators which has been highly heated by the effluent products of combustion. In my furnace I use a vertical heating-stove, through which the waste products of combustion pass on their way to the chimney, and in which stove are placed standing pipes, through one series of which the air and through another series the gas pass to the working-chamber of the furnace, the influent air being partially heated before entering the stove by passing under the hearth of the furnace and through a pipe in the flue which conducts the waste products of combustion to the stove.

In the drawings, A is the working-chamber of a metallurgic furnace, which may be of the ordinary construction of gas-furnaces, excepting as hereinafter stated. B is the heating-stove, which may be a rectangular chamber built of fire-brick and placed in close proximity to the hearth of the furnace, so as to form one end thereof. At the other end of the furnace are the vertical passages C C C, into which the waste products of combustion of the working-chamber enter through the openings $a$ and pass downward through those passages C to the horizontal flue D, which opens into the lower end of the stove B, and thence pass upward through the stove to the chimney E, having no other exit.

Within the chamber of the stove B are placed a series of standing pipes, G, the number of which depends upon the size of the furnace, and are made of some suitable refractory material. Their shape in cross-section is that of a flattened cylinder, and they are set in vertical position on a foundation of firebrick, F. These standing pipes G are for the purpose of heating the air passing through them by the waste products of combustion which traverse the chamber of the stove B, and of conducting the heated air to the working-chamber of the furnace. They are closed at the top by a tile or cover, $g$, and each of them opens by means of a short pipe or passage, $i$, into the working-chamber A near the crown or roof and at a higher level than the gas-entrance $i'$.

Within the chamber or stove B, parallel to the standing pipes G, but nearer to the working-chamber A, are a series of standing pipes, H, similar in shape, construction, and material to the pipes G, but shorter and of smaller internal area in cross-section. These pipes are for the passage of the gas to the furnace. They are closed at the top by a tile or cover h, and open by passages i' into the upper part of the working-chamber forward of and at a lower level than the entrance i of the air-pipes. The standing pipes H are set vertically on a rectangular chest, K, (which is situate within the chamber of the stove B above the level of the flue D,) and extend transversely across the stove B. The upper side of the chest K has openings k, corresponding in number and size with the interior of the pipes H, over which those pipes are set, so that gas entering the gas-chest K may pass up through the pipes H and enter the working-chamber at i'. The products of combustion of the working-chamber, entering the stove B from the flue D, pass all around the standing pipes G and H and communicate their heat to the air and gas traversing those pipes.

The pipes G and H may be conveniently made in sections of convenient length, jointed together as shown in Fig. 4, and in order that they may be the better able to withstand the degree of heat to which they will be exposed I prefer to construct them of porous clay, such as is used for constructing glass-melting pots, mixed with about one-third of sand. Such pipes are also less liable to expand or contract with the heat than if made of ordinary fire-clay. The gas, whether natural or artificial, enters the chest K through a pipe, L, which is furnished at any convenient place with a valve or register, l, for the admission of a regulated amount of air into the gas-pipe, when desired, for the purpose hereinafter explained.

The horizontal flue D, which conducts the waste products of combustion from the passages C to the stove B, is traversed longitudinally by a series of parallel pipes, I, formed in sections of refractory material, (preferably glass, pot-clay, and sand, as before stated.) Those pipes are made of the shape in cross-section shown in Fig. 3, being a cylinder supported on a semi-cylinder, the semi-cylindrical part forming legs to support the cylindrical portion. These sections of pipe are jointed at the ends, and are preferably alternated with sections of pipe of similar diameter which are cylindrical, so that the products of combustion traversing the flue D may pass under the pipes I as well as around them on their sides and upper portion. Each of the pipes I opens at the front end of the furnace into the lower part of one of the standing pipes G, and at the rear end into a transverse passage, J, (see Fig. 1,) into which air is admitted through a mushroom-valve, j, either directly from outside or preferably after passing underneath the hearth of the furnace. For this purpose the hearth of the furnace is supported on I-beams, (see Fig. 1,) which form transverse flues c under the working-chamber, into which the outside air enters, and passes, as shown by arrows in Fig. 2, into a trunk, d, and thence into the valve-chest e, which is closed, so as to exclude the cold outside air, but is furnished with a shutter, b, so that air may be admitted in that direction, if found necessary.

Transversely across the crown of the furnace are placed a row of steam-tuyeres, m. Four will suffice in a furnace of ordinary size. These tuyeres are introduced near the front end of the furnace, inclining downward to a point about in the middle of the hearth in line with the tap-hole. Two other steam-tuyeres, n n', are introduced on opposite sides of the furnace, one, n, just in front of the influent gas-passage i', and the other, n', about the same level, a little nearer the middle of the hearth. Another steam-tuyere, o, is introduced from the outside of the stove B, passing through it and opening in the influent air-opening i. These steam-tuyeres m, n, n', and o are all made of steam-pipe placed in a larger pipe of about one and one-half inch diameter, so as to leave a space around the steam-pipe for the entrance of an induced current of air, the extremity of the steam-pipes being reduced in diameter to about one-eighth of an inch, so as to produce a jet of steam. The steam introduced through these tuyeres may be either live steam from a boiler or superheated steam, and they are especially useful when natural gas is employed.

The operation of my furnace is as follows: The air entering the passages c under the working-chamber of the furnace, by which means it becomes somewhat heated, or, if preferred, introduced through the shutter b in the valve-chest e, or through both, passes through the mushroom-valve j in regulated quantity into the horizontal pipe l, where it is still further heated by the waste products of combustion traversing the flue D. Thence it enters the lower end of the standing pipes, and rising up through them it becomes highly heated and enters the working-chamber at i. The gas enters the gas-chest K through the pipe L, passes up the standing pipes H, and thence into the working-chamber at i', below the point where the hot air enters. A vivid combustion and intense heat are thereby created inside of the working-chamber, increased by the steam or superheated steam injected through the tuyeres m n n' o, or some of them. The waste products of combustion from the furnace pass out at the rear end through the effluent passage a, down the vertical passage C, and thence into the horizontal flue D, where they surround the pipes I, and thence enter the chamber of the stove B and find their exit at the chimney E. If natural gas is employed, the furnace is operated in substantially the same way; but the gas entering the gas-chest K through the pipe L is mixed with a small quantity of air, which is introduced through the register l, so that the gas enters the standing pipes H mixed with a sufficient amount of air to permit of a slow combustion of the natural gas. One per cent. of air will generally be found sufficient; but I do not limit myself to that proportion. When the furnace is started, the mixed gas and air is lighted, and if the supply of air is sufficient it will continue to burn with a light blue flame and enter the working-chamber of the furnace in that condition. This prevents the danger of explosions, which previous to my invention presented an insuperable obstacle to the successful use of natural gas in metallurgic furnaces.

This method of using natural gas in furnaces forms the subject of a separate application for Letters Patent, and therefore is not claimed in this application.

Having thus described my improvement, what I claim as my invention, and desire to secure by Letters Patent, is—

1. In a furnace for metallurgic and other processes requiring a high degree of heat, the combination, with the working-chamber, of a heating-chamber connecting with the escape-flue and chimney of the furnace, and the two vertical series of standing pipes arranged one behind the other in the heating-chamber and communicating with the working-chamber at the top, one of said series being connected with an air-supply and the other with a gas-supply, whereby the air and gases are heated previous to entering the working-chamber, substantially as specified.

2. In a furnace for metallurgic and other purposes, the combination, with the working-chamber, of a stove for heating the inflowing gas or air, consisting of two series of vertical pipes connecting the upper part of the furnace at different levels, the gas and air connections leading to said pipes, and the escape-flues connecting the working-chamber with the stove, substantially as and for the purposes specified.

3. In combination with the working-chamber of a furnace, the stove constructed with two series of vertical heating-pipes connecting with said chamber, as described, a series of air-passages immediately beneath the bottom of the working-chamber and communicating with an air trunk or passage, and a valve for admitting the air into the flue for conducting the partially-heated air into the air-pipes of the stove, substantially as specified.

4. In combination with the working-chamber of a furnace and a heating-stove having two series of vertical pipes, one for heating gas and the other for air, and air pipes or passages immediately beneath the bottom of the working-chamber, an air trunk and flue connected by a valve and communicating with the air-pipes of the heating-stove, and a register or valve for admitting a regulated amount of air from outside into the air-passage leading to the stove, substantially as described.

5. In combination with the working-chamber of a furnace, and a heating-stove having two series of vertical pipes for gas and air, respectively, an air-pipe communicating with the air-pipes within the stove, and a gas-pipe communicating with the gas-pipes within the stove, and a register or valve for admitting a regulated amount of air into the gas chamber and pipes of the stove, substantially as and for the purposes described.

6. The combination, with the working-chamber of a furnace, of two series of vertical pipes for gas and air, respectively, opening into said working-chamber at different levels, and an air and steam tuyere the mouth of which is placed within the heated air-passage to the working-chamber, substantially as and for the purposes specified.

7. In combination with the working-chamber of a furnace and a heating-stove having two series of vertical pipes for air and gas, respectively, opening into said working-chamber at different levels, a steam-pipe introduced into the working-chamber on one side thereof, near and in front of the gas-entrance, and another steam-pipe entering the working-chamber from the other side thereof, in front of the air-entrance, arranged substantially as described, and for the purposes set forth.

8. In combination with the working-chamber of a furnace and a heating-stove having two series of vertical pipes for air and gas, respectively, opening into said working-chamber at different levels, one or more steam-pipes introduced through the reverberating crown of said working-chamber, near to the mouth of the air and gas passages, at such inclination as to direct a current of steam toward the bottom of the furnace at a point about midway from either end, substantially as described.

9. The combination, with the furnace, of an air-heating stove and its induction-flue, consisting of sectional jointed pipes of suitable refractory material, having downward semitubular extensions for supporting them in a horizontal position within a horizontal flue which conducts the waste products of combustion from the working-chamber of the furnace to the chimney, substantially as and for the purpose described.

In testimony whereof I have hereunto set my hand this 17th day of December, A. D. 1883.

THOMAS G. KIRKPATRICK.

Witnesses:
W. BAKEWELL,
W. B. CORWIN.